(12) United States Patent
Ulgen

(10) Patent No.: US 8,066,304 B2
(45) Date of Patent: Nov. 29, 2011

(54) RETRACTABLE MUD FLAP FOR VEHICLES

(76) Inventor: Memet Nevres Ulgen, Istanbul (TR)

( * ) Notice: Subject to any disclaimer, the term of this patent is extended or adjusted under 35 U.S.C. 154(b) by 161 days.

(21) Appl. No.: 12/420,321

(22) Filed: Apr. 8, 2009

(65) Prior Publication Data

US 2009/0273176 A1    Nov. 5, 2009

(30) Foreign Application Priority Data

Apr. 30, 2008 (TR) .............................. U 2008 02987

(51) Int. Cl.
*B62D 25/18* (2006.01)
(52) U.S. Cl. ....................... 280/851; 280/847; 280/848
(58) Field of Classification Search .................. 280/847, 280/848, 849, 850, 851, 152.05; *B62D 25/16, B62D 25/18*
See application file for complete search history.

(56) References Cited

U.S. PATENT DOCUMENTS

| | | | | |
|---|---|---|---|---|
| 2,530,857 A | * | 11/1950 | Campbell | 280/847 |
| 2,940,773 A | * | 6/1960 | Eaves | 280/851 |
| 2,947,375 A | * | 8/1960 | Lehmann | 180/371 |
| 3,486,764 A | * | 12/1969 | Beyer et al. | 280/851 |
| 4,362,310 A | * | 12/1982 | Goodall | 280/157 |
| 5,582,431 A | * | 12/1996 | Anderson | 280/851 |
| 2003/0184078 A1 | * | 10/2003 | Grable | 280/847 |
| 2007/0182151 A1 | * | 8/2007 | Aulabaugh | 280/849 |

FOREIGN PATENT DOCUMENTS

| | | | | |
|---|---|---|---|---|
| DE | 3214901 A1 | * | 10/1983 | |
| DE | 3401631 A1 | * | 7/1985 | |
| DE | 3402754 A1 | * | 8/1985 | |
| EP | 161500 A1 | * | 11/1985 | |
| EP | 411262 A1 | * | 2/1991 | |
| EP | 1172283 A1 | * | 1/2002 | |
| FR | 2584669 A1 | * | 1/1987 | |
| FR | 2798110 A1 | * | 3/2001 | |
| FR | 2813847 A1 | * | 3/2002 | |
| GB | 2124988 A | * | 2/1984 | |

* cited by examiner

*Primary Examiner* — Faye M Fleming
*Assistant Examiner* — Laura Freedman
(74) *Attorney, Agent, or Firm* — Vidas, Arrett & Steinkraus, P.A.

(57) ABSTRACT

A mud flap for land vehicles, comprising at least one drive element (4) cooperating with the mud flap (1) for pivoting thereof to a desired position around the vehicle wheel.

3 Claims, 5 Drawing Sheets

RETRACTABLE MUD FLAP FOR VEHICLES

FIELD OF INVENTION

The present invention relates to an optionally retractable mud flap for use in land vehicles, such as automobiles, buses, minibuses, etc.

BACKGROUND OF INVENTION

Mudguards are arranged over the wheels of vehicles for preventing wheel-thrown mud or water from splashing onto the interior and partly the exterior of the chassis, while the respective land vehicle is driven on wet or muddy road surfaces. A mudguard has typically a half crescent form, and is assembled to the vehicle chassis, which remains above the wheel.

Most mudguards are not quite efficient in preventing from splashing mud to lateral surfaces of a motor vehicle when same is driven on watery road surfaces.

Use of mud flaps mounted to the chassis at the back of wheels substantially vertical to the ground is known for preventing the splashing of mud onto the chassis of a vehicle.

Since such mud flaps were fixed to the chassis of a vehicle, their use has been abandoned in modern vehicles as the existence (permanently) of mud flaps have not been found by users eye-pleasing. However, the problem of splashing of mud onto the chassis of a vehicle while the same is driven on watery or muddy roads maintain its presence, as has been in the past.

BRIEF DESCRIPTION OF INVENTION

The object of the present invention is to prevent the splashing of mud onto the chassis of land vehicles like automobiles, tracks etc. while the same are driven on watery or muddy road surfaces, by means of a retractable mud flap.

This objective is achieved via a retractable mud flap driven by at least one drive element connected to the mud flap to locate by pivoting the mud flap to a desired position around the wheel, for preventing the vehicle chassis from splashing mud thrown by the vehicle wheel on watery or muddy road surfaces.

The mud flap according to the present invention comprises a circular form optionally hidden under the mudguard of the vehicle when it is not in use, and once activated the mud flap is enabled to pivot partially around the center of the wheel axis.

DESCRIPTION OF FIGURES

The present invention is to be evaluated together with annexed figures briefly described hereunder to make clear the subject embodiment and the advantages thereof.

DESCRIPTION OF INVENTION

Figure 1:
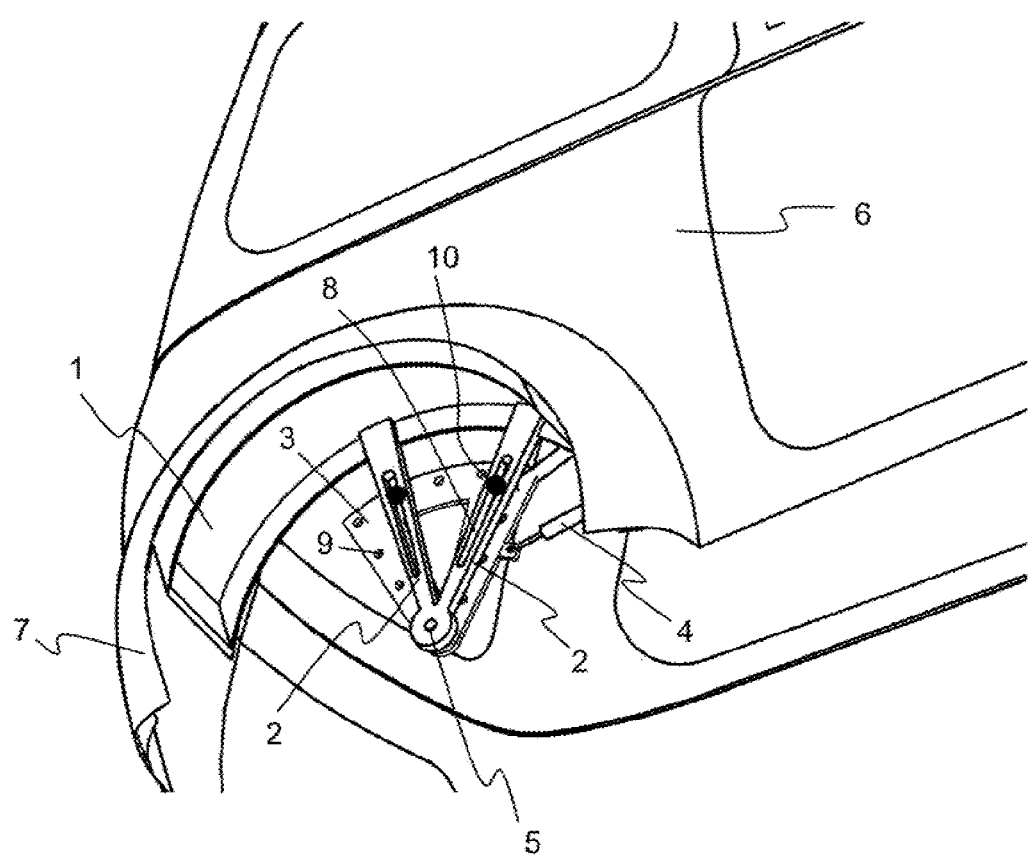
FIG. 1 illustrates the position when the mud flap is not in use, i.e. is hidden.

As illustrated in FIG. 1, the retractable mud flap (1) arranged under the mud guard (7) encircling the vehicle wheel (6) from above and comprises a curvilinear form similar to the form of the mud guard (7). There is provided an arm (2) or arms, one end thereof connected to the mud flap (1), and rotatably seated on the vehicle's axle (5) from the other end.

In a transverse inward direction behind the arms (2) is disposed a plate (3), which can be rotated around the wheel axis to which the arms are coupled (2). By a drive element (4) connected from one end to the vehicle's chassis, and the plate (3) from the other end, the plate (3) can be pivoted. In a preferred embodiment, one end of the drive element (4) is fastened to the plate (3) at a location close to the center, whereas one end of another drive element (4) is fastened to the plate at a location that is far from the center.

The surface of plate (3) is provided with a number of slots (9), and the longitudinal axes of arms (2) are provided with slits (8). A slide element (10), e.g. as a pin, fixed to one of the slots (9) operates at the same time in the slit (8) of the respective arm in a sliding manner. Thus, when linear drive is supplied to the rod of piston, i.e. drive element, the plate (3) and the slide element (10) fixed to the respective plate slot (9) are forced to move, and while this slide element (10) slides in the arm slit (8), it exerts force to the arm (2) so that the mud flap (1) is pivoted. It is also possible to pivot the mud flap (1), without making use of any slide element (10) referred to above. For this purpose, two drive elements (4), one being close to and the other far from the plate (3) center, may be utilized.

According to the preferred embodiment of the present invention, the drive elements (4) are hydraulic- or pneumatic-operating pistons, but other conventional drive elements can also be used with same purposes.

Figure 2:
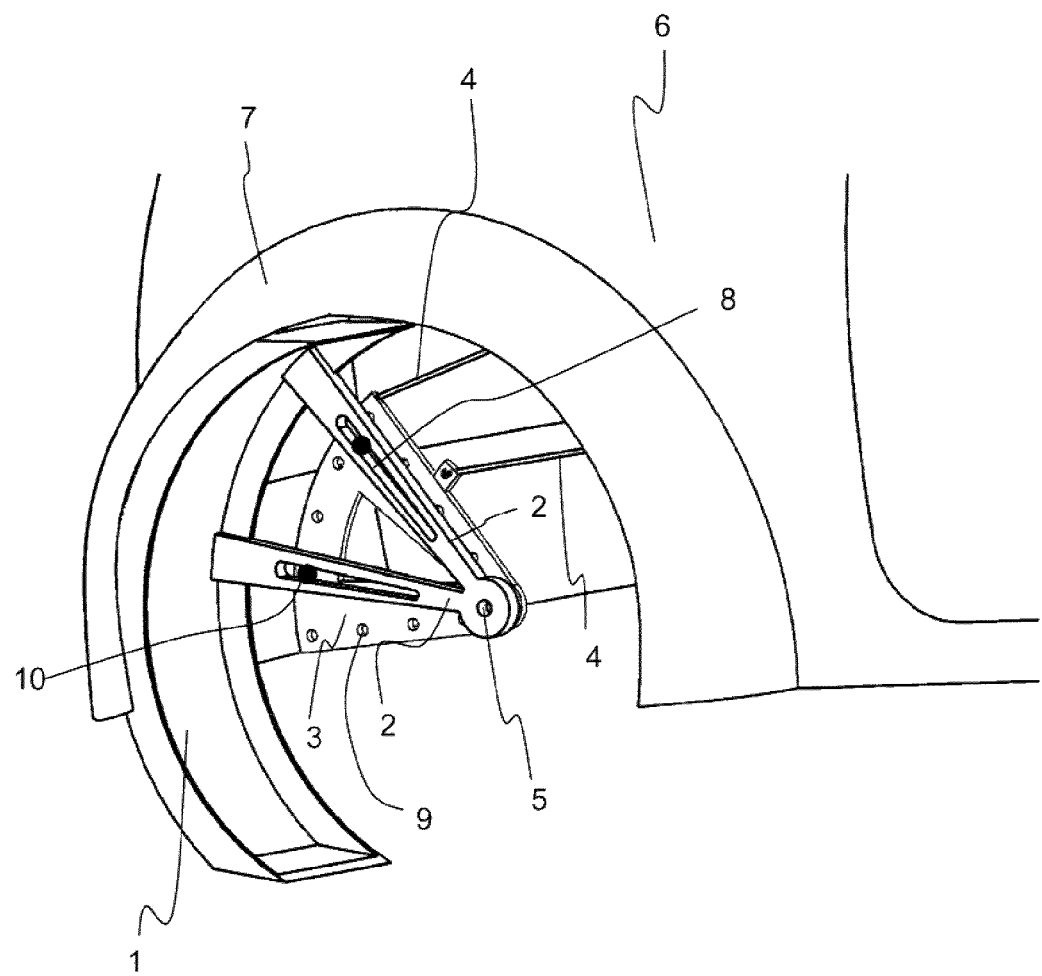
FIG. 2 illustrates the position when the mud flap is in use.
Figure 3:
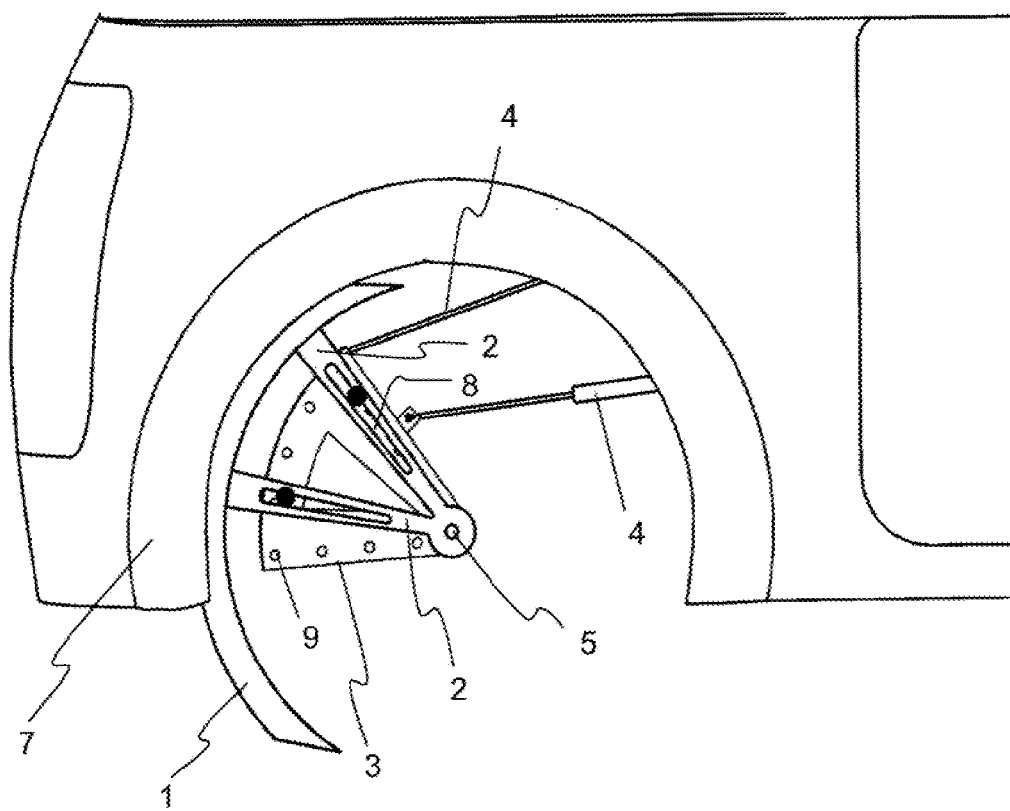
FIG. 3 illustrates side view of the mud flap when same is in use.

In order to pivot the plate (3) and the connected mud flap (1) as illustrated in FIG. 2 and FIG. 3, the drive command supplied to the drive element (4) can be controlled either by means of a control button by the driver in the vehicle, or alternatively in an automatic manner, by means of a sensor that can be disposed near the mud guard or at any other location of the vehicle. Similarly, when there is no need to use the mud flap (1), it can be moved to the hidden position, as illustrated in FIG. 1, by the driver by means of a control button, or automatically.

Figure 4:
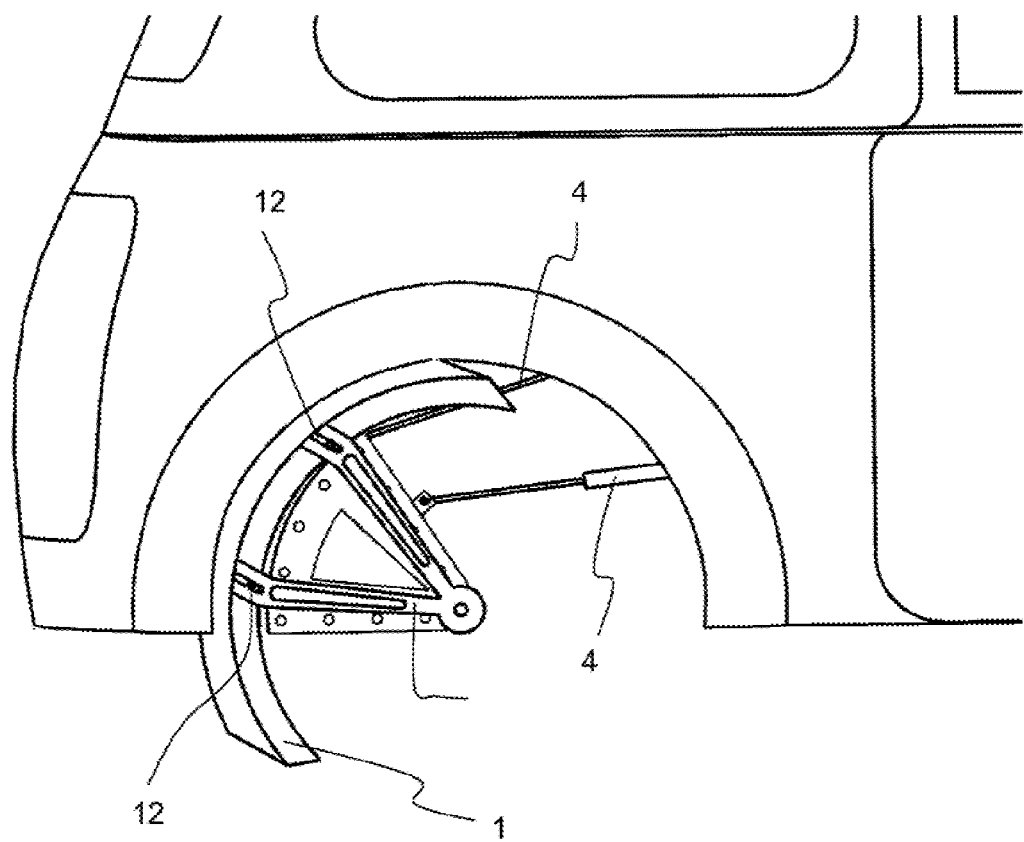
FIG. 4 illustrates an alternative embodiment of the mud flap when the mud flap is in open position.
Figure 5:
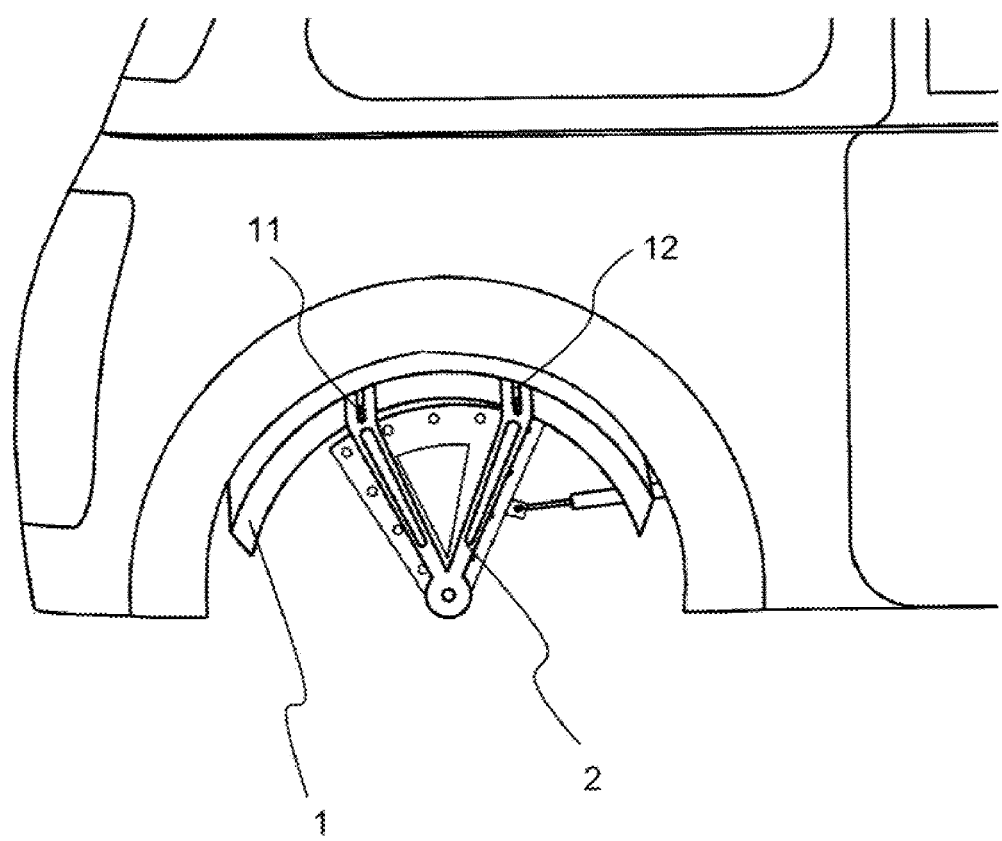
FIG. 5 illustrates the closed position of the mud flap in FIG. 4.

According to an alternative embodiment of the present invention illustrated in FIG. 4 and FIG. 5, adjustment screws (12) are provided through adjustment holes (11) formed at the arm axis direction at the end portion of arms (2) far from the wheel axis (5), these adjustment screws (12) being fastened to corresponding screw holes of the mud flap (1). By fixing the adjustment screws (12) through adjustment holes (11) at desired points, the mud flap (1) is brought close or far from the wheel axis (5).

The invention claimed is:

1. A retractable mud flap for a land vehicle having mud guards encircling wheels of the vehicle from above, the mud flap being arranged under a respective mud guard and having a curvilinear form, the mud flap comprising:
   at least one arm connected at one end to the mud flap and rotatably seated on an axle of the vehicle from an other end to rotate around an axis of a respective wheel, the at least one arm having a slit formed along a longitudinal length of the at least one arm;
   a plate rotatable around the axis of the respective wheel, the plate having a plurality of slots formed thereon;
   a slide element fixed to one of the plurality of slots of the plate, and the slide element being slidably movable in the slit of the at least one arm; and
   at least one drive element for driving the plate.

2. A retractable mud flap according to claim 1, wherein the at least one drive element comprises a piston.

3. A retractable mud flap according to claim 1, wherein the at least one arm defines adjustment holes formed at an end with respect to the axis of the respective wheel such that screws placed through said adjustment holes may adjustably fix said mud flap.

* * * * *